(12) United States Patent
Birkmayer et al.

(10) Patent No.: US 11,527,934 B2
(45) Date of Patent: Dec. 13, 2022

(54) ELECTRICAL MACHINE WITH VOLTAGE DETECTION CIRCUIT

(71) Applicant: Rolls-Royce Deutschland Ltd & Co KG, Blankenfelde-Mahlow (DE)

(72) Inventors: Wolfram Siegfried Birkmayer, Röttenbach (DE); Karsten Brach, Berlin (DE); Korbinian König-Petermaier, Munich (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 27 days.

(21) Appl. No.: 16/975,706

(22) PCT Filed: Feb. 14, 2019

(86) PCT No.: PCT/EP2019/053718
§ 371 (c)(1),
(2) Date: Aug. 25, 2020

(87) PCT Pub. No.: WO2019/174847
PCT Pub. Date: Sep. 19, 2019

(65) Prior Publication Data
US 2021/0367470 A1    Nov. 25, 2021

(30) Foreign Application Priority Data

Mar. 13, 2018 (DE) ............ 10 2018 203 775.2

(51) Int. Cl.
*H02K 3/34* (2006.01)
*H02K 11/26* (2016.01)
*B64D 27/24* (2006.01)

(52) U.S. Cl.
CPC .............. *H02K 3/34* (2013.01); *B64D 27/24* (2013.01); *H02K 11/26* (2016.01)

(58) Field of Classification Search
CPC .......... H02K 3/34; H02K 3/345; H02K 11/26; H02K 11/27; H02K 11/20; B64D 27/24
(Continued)

(56) References Cited

U.S. PATENT DOCUMENTS 3,265,998 A    8/1966  Park
3,515,923 A *  6/1970  Clizbe ................. H02K 3/345
                                                     310/215
(Continued)

FOREIGN PATENT DOCUMENTS

CH          607264 A5    11/1978
DE    102005015785 A1    11/2006
(Continued)

OTHER PUBLICATIONS

German Office Action for German Application No. 10 2018 203 775.2 dated Feb. 1, 2019.
(Continued)

*Primary Examiner* — Michael Andrews
(74) *Attorney, Agent, or Firm* — Lempia Summerfield Katz LLC

(57) ABSTRACT

The invention relates to an electrical machine (10), comprising at least one first coil (12), which is surrounded by a first electrical insulation element (24) at least in a partial region, and at least one second coil (14), which is surrounded by a second electrical insulation element (26) at least in a partial region, wherein at least one electrically conductive layer (28) provided in addition to the coils (12, 14) and in addition to the electrical insulation elements (24, 26) is arranged between the coils (12, 14).

18 Claims, 2 Drawing Sheets

(58) Field of Classification Search
USPC .......................................................... 310/68 B
See application file for complete search history.

(56) References Cited

U.S. PATENT DOCUMENTS

| | | | | |
|---|---|---|---|---|
| 2016/0344264 | A1* | 11/2016 | Raminosoa | H02K 9/227 |
| 2017/0237383 | A1* | 8/2017 | Buffenbarger | H02K 11/33 |
| | | | | 310/58 |
| 2019/0068044 | A1* | 2/2019 | Petrovich | G21C 15/00 |

FOREIGN PATENT DOCUMENTS

| | | | | | |
|---|---|---|---|---|---|
| EP | 0061608 | A1 | | 10/1982 | |
| GB | 1600239 | A | * | 10/1981 | ............... H02K 1/06 |
| GB | 1600239 | A | | 10/1981 | |
| GB | 1600240 | A | | 10/1981 | |
| WO | 2013143865 | A1 | | 10/2013 | |
| WO | 2015058298 | A1 | | 4/2015 | |

OTHER PUBLICATIONS

International Search Report and the Written Opinion for International Patent Application PCT/EP2019/053718 dated May 21, 2019.

\* cited by examiner

ELECTRICAL MACHINE WITH VOLTAGE DETECTION CIRCUIT

This application is the National Stage of International Application No. PCT/EP2019/053718, filed Feb. 14, 2019, which claims the benefit of German Patent Application No. DE 10 2018 203 775.2, filed Mar. 13, 2018. The entire contents of these documents are hereby incorporated herein by reference.

BACKGROUND

The present embodiments relate to an electrical machine and an aircraft including at least one electrical machine.

The development of modern vehicles, such as land vehicles and aircraft, for example, allows for increasing electrification of the drive trains of the vehicles. This provides that the respective drive train has at least one electrical machine by which the respective vehicle may be electrically driven or that provides a local electrical supply system on the vehicle (e.g., a generator). A drive train, by which the vehicle may be driven (e.g., exclusively driven) is also referred to as an electrical drive system. In addition to the required power density of electrical drive systems of this kind (e.g., for aircraft), the fail safety of the drive system has the highest priority. In this case, particular attention should be paid to the short-circuit resistance of the respective electrical component or to the detection of a short circuit in the component in order to be able to take at least one protective measure, such as switching off the drive system, for example, as a result of a short circuit of this kind, for example.

SUMMARY AND DESCRIPTION

The scope of the present invention is defined solely by the appended claims and is not affected to any degree by the statements within this summary.

The present embodiments may obviate one or more of the drawbacks or limitations in the related art. For example, particularly safe operation of an electrical machine and a vehicle may be implemented.

In one embodiment, an electrical machine (e.g., for a vehicle such as an aircraft) may be driven by the electrical machine or using the electrical machine. The electrical machine has at least one first coil that is sheathed at least in a subregion by a first electrical insulation. The electrical machine according to the present embodiments also has at least one second coil that is sheathed at least in a subregion by a second electrical insulation. The respective electrical insulation is also referred to as a main insulation since the respective coil is electrically insulated from the respectively other coil and/or from at least one further component of the electrical machine by the respective associated electrical insulation. The respective coil itself is an electrical component and has at least one winding or may have a plurality of windings that are formed by at least one electrical conductor of the respective coil. Electric current may flow through the electrical conductor and, therefore, the respective coil in order to in this way at least temporarily generate at least one magnetic field (e.g., by the respective coil).

In order to implement particularly safe operation of the electrical machine and therefore of the vehicle that is provided, for example, for transporting people and/or goods, at least one electrically conductive layer that is provided in addition to the coils and in addition to the electrical insulations is arranged between the coils. The electrical machine according to the present embodiments may be suitable for use in a vehicle, but the machine may likewise be used for other applications.

The feature that the electrically conductive layer is arranged between the coils of the electrical machine may provide, for example, that the first coil is at least partially (e.g., at least predominantly or completely) covered or overlapped in relation to the second coil, or vice versa, by the electrically conductive layer, so that the electrically conductive layer is arranged between respective, mutually facing sides of the coils and in so doing in a manner covering or overlapping with these sides. If, for example, the main insulation of one of the coils is damaged, a direct electrical short circuit to the respectively other coil may not only be avoided, but the short circuit or the fault may be transferred to the electrically conductive layer and, therefore, intercepted by the electrically conductive layer. This situation may thus be transformed into a fault situation of the kind that is significantly easier to handle than a direct short circuit between the coils. In this way, excessive damage to the electrical machine resulting from damage to the main insulation may be avoided. For example, total failure of the electrical machine may be avoided, so that, for example, the electrical machine may continue to be operated in spite of the damage to the main insulation. As an alternative or in addition, it is possible, owing to the use and the arrangement of the electrically conductive layer between the coils, for excessive damage resulting from damage to the main insulation and, for example, total failure of a drive train including the electrical machine for driving the vehicle to be able to be avoided, so that particularly safe operation of the vehicle may be provided by the electrical machine according to the present embodiments.

The coils may be coils that are directly or immediately adjacent to one another (e.g., no other, further coil is arranged between the coils). In this case, one or more of the present embodiments are based on the knowledge that adjacent coils and corresponding supply lines and circuits (e.g., in electrical machines for driving vehicles) may have large differences in the respective electrical potential. The coils are usually protected or insulated by an electrical insulation or sufficiently large air gaps. However, in the event of a loss of the insulation property (e.g., in the case of mechanical damage due to environmental influences, improper use, ingress of foreign substances such as moisture and/or electrically conductive foreign bodies, or aging), short circuits may occur. Some of the short circuits have high short-circuit currents. Owing to a high heat input, these short-circuit currents may lead to destruction of the electrical machine. This, however, may now be avoided by using the electrical machine according to the present embodiments.

In the case of electrical machines, the short-circuit resistance may be carried out by a robust, time-resistant design of a suitable electrical insulation system of appropriate design and accurate checking of the insulation during and after manufacture. Checking for sufficient insulation (e.g., during maintenance of the electrical machine) may be carried out only with a high level of complexity. Under certain circumstances, detection of short circuits between individual coils during operation may not be able to be detected from the outside (e.g., at machine terminals), and therefore, a local fault may not be able to be detected. A short circuit may lead to complete destruction of the machine if no detection and consequently no protective intervention or no protective measure may take place. In the case of the electrical machine according to the present embodiments, at least the prerequisite is now created to avoid the abovementioned problems and disadvantages, so that particularly safe operation may be implemented. For example, particularly fail-safe operation may be implemented, and any possible short circuit may be detected without excessive damage that is caused by the short circuit occurring. As a result, appropriate protective measures may be taken to avoid further, excessive damage to the electrical machine that results from the short circuit.

In one embodiment, the electrically conductive layer is arranged within the first insulation between the first insulation and the first coil.

In a further embodiment, the electrically conductive layer is arranged outside the first insulation. As a result of this, the first insulation is arranged between the electrically conductive layer and the first coil. Owing to the respective arrangement of the electrically conductive layer outside or inside the main insulation, a direct short circuit between the coils may be reliably prevented, and any short circuit of this kind may be detected in a safe and reliable manner. The electrically conductive layer may be arranged both in a slot region and also in an end winding region of the coil or a winding of the end winding region in order to be able to reliably prevent a direct short circuit between the coils in this way.

In one embodiment, the electrically conductive layer may be arranged only or exclusively between the two coils, so that the electrically conductive layer covers or overlaps in each case only precisely one side of one of the coils toward the at least other coil.

However, in order to be able to particularly reliably prevent a direct short circuit between the coils and safely detect a short circuit of this kind, the electrically conductive layer may surround at least a portion of the first coil on at least two sides that are averted from one another. For example, the first coil may be at least predominantly (e.g., completely) sheathed by the electrically conductive layer. Therefore, for example, the first electrical insulation constitutes a first sheathing of the first coil, where the electrically conductive layer constitutes a second sheathing of the first coil.

In order to be able to prevent direct short circuits between the coils and also to detect any short circuits, in a further refinement, at least one second electrically conductive layer provided in addition to the coils and in addition to the electrical insulations may be arranged between the coils. The electrically conductive layers are formed, for example, from materials that differ from one another or by the same material. Where reference is made to the electrically conductive layer in the text that follows, the statements made in this respect may selectively be transferred to the first electrically conductive layer and to the second electrically conductive layer.

The electrically conductive layer is formed, for example, by a solid component (e.g., by a component in the solid state of aggregation). As a result of this, the electrically conductive layer may be positioned in a particularly advantageous manner.

In order to be able to precisely detect and, for example, assign damage to the respective main insulation, for example, in a further refinement, the electrically conductive layers may be electrically insulated from one another by a phase separator that is arranged between the electrically conductive layers. Particularly safe operation may be provided in this way.

In one embodiment, the second electrically conductive layer is arranged within the second insulation between the second insulation and the second coil.

In one embodiment, the second electrically conductive layer surrounds at least a portion of the second coil on at least two sides that are averted from one another. For example, the second electrically conductive layer is configured, for example, as a sheathing of the second coil, so that the second coil is at least partially (e.g., at least predominantly or completely) surrounded or sheathed by the second electrically conductive layer.

A further embodiment is distinguished in that the second electrically conductive layer is arranged outside the second insulation. As a result of this, the second insulation is arranged between the second electrically conductive layer and the second coil.

In order to implement particularly safe operation, in a further refinement, the electrically conductive layers may be electrically connected to one another (e.g., with a high impedance). In other words, a connection (e.g., a high-impedance connection) of the or all electrically conductive layers to one another may be provided.

In order to be able to detect any damage to at least one of the main insulations, in a further refinement, the electrically conductive layers (e.g., the first electrically conductive layer and/or the second electrically conductive layer) may be electrically connected to a predetermined ground potential (e.g., with a high impedance). The ground potential is the potential of the ground or the earth on which the vehicle is standing (e.g., when the vehicle is on the ground and/or when a connection that provides the ground potential is electrically connected to the ground). Further, the ground potential may be a potential of a structure or of a casing of the vehicle (e.g., when the vehicle is in the air and therefore not touching the ground), where the electrical machine is arranged, for example, in the structure or in the casing. For example, the structure or the casing is formed, for example, from a metal material.

In a further refinement, a detection device is provided. The detection device may detect an electrical voltage between the electrically conductive layer and a reference potential. By detecting the electrical voltage, a short circuit or damage to at least one of the main insulations may be detected, for example (e.g., when the electrical voltage that is detected by the detection device exceeds a prespecifiable threshold value).

In one embodiment, the reference potential is the ground potential. In other words, the detection device renders possible voltage measurement between the electrically conductive layer and the reference potential (e.g., across a high-impedance grounding resistor). A direct short circuit from one of the coils to the respectively other coil is also prevented by the electrically conductive layer in the event of damage to the respective main insulation, so that only a short circuit between in each case one of the coils and the electrically conductive layer may occur. A short circuit of this kind may be detected, for example, by the detection device. If a short circuit of this kind is detected by the detection device, at least one protective measure or countermeasure may be initiated depending on the detection of the short circuit. Undesired effects that result from a short circuit of this kind may be prevented by the protective measure or the countermeasure.

If, for example, the electrically conductive layer is a constituent part of an IT network that is a non-grounded system, a fault indication takes place, for example, in the event of a short circuit between one of the coils and the electrically conductive layer. As a result of the fault indication, the detection device detects that the electrical voltage that is detected by the detection device exceeds a prespecifiable threshold value. The electrical machine is switched off, for example, only in the event of a double fault.

If the electrically conductive layer is, for example, a constituent part of a TN network and therefore of a grounded system, the electrical machine is switched off, for example, in the event of a short circuit between the respective coil and the electrically conductive layer (e.g., when a short circuit of this kind is detected), such that the detection device detects that the electrical voltage that is detected by the detection device exceeds a prespecifiable threshold value.

In one embodiment, the electrical machine is configured to drive the vehicle. The electrical machine may have, for example, a stator and a rotor that may rotate about a rotation axis relative to the stator. For example, the rotor may be driven by the stator and in this way may be rotated about the rotation axis relative to the stator. For example, the electrical machine may be operated as an electric motor in which the stator drives the rotor. An electrical machine constitutes a particularly important, if not the most important, part of an electric drive for driving a vehicle, where particularly safe operation of the electrical machine and therefore of the vehicle overall may be provided by the electrical machine according to the present embodiments.

It is further possible for the electrical machine to be operated as a generator. In this case, the rotor is driven by mechanical energy and in this way rotated about the rotation axis relative to the rotor. In the process, the generator converts at least a portion of the mechanical energy into electrical energy and makes the electrical energy available, for example. In another embodiment, the electrical machine may be configured as a linear machine or as a linear motor. In this case, the electrical machine has, for example, a stator and a rotor that may be moved relative to the stator along at least or precisely one axis in a translatory manner. The rotor may be driven by the stator, for example.

The present embodiments also include an aircraft that has at least one electrical machine. Advantages and advantageous refinements of the electrical machine according to the present embodiments are to be regarded as advantages and advantageous refinements of the vehicle according to the present embodiments, and vice versa.

The present embodiments render possible simple detection and therefore the possibility of protective intervention or a protective measure to prevent destruction of the electrical machine. A protective measure of this kind may be, for example, switching off a drive, which includes the electrical machine, for driving the motor vehicle. The electrically conductive layer, which is configured as a sheathing of the coil, for example, may be very thin, so that the weight and the installation space requirement of the electrical machine may be kept particularly low. This provides that the basic installation space requirement of the electrical machine changes only slightly from that of a conventional electrical machine without the electrically conductive layer, so that, for example, an excessive reduction in the copper fill factor may be avoided. The electrically conductive layer has a low electrical conductivity in order to prevent significant additional losses due to eddy currents in the electrically conductive layer. To this end, the electrically conductive layer is formed, for example, by at least one or more carbon nanotube films and/or at least one or more mica tapes and/or other components. The performance and the operating behavior of the electrical machine according to the present embodiments may remain at least virtually unchanged in comparison to the performance and the operating behavior of a conventional electrical machine; therefore, the electrical machine according to the present embodiments also allows high electrical power densities for driving the vehicle to be achieved.

Further advantages, features, and details of the invention may be gathered from the following description of preferred exemplary embodiments and with reference to the drawing. The features and combinations of features cited above in the description and the features and combinations of features cited below in the description of the figures and/or shown in the figures alone may be used not only in the respectively indicated combination but also in other combinations or on their own, without departing from the scope of the invention.

DETAILED DESCRIPTION

Same or functionally same elements are provided with the same reference symbols in the figures.

Figure 1:
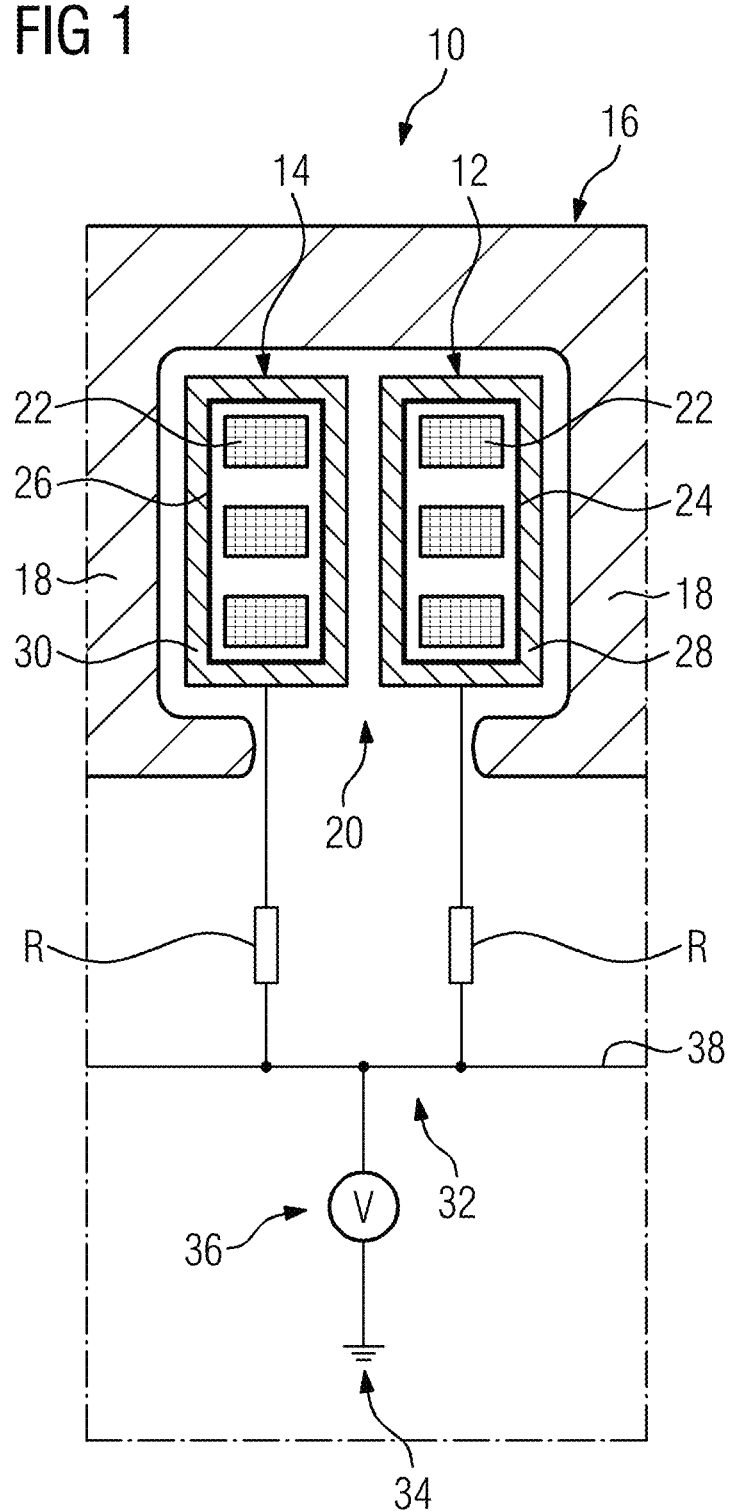
FIG. 1 shows a detail of a schematic sectional view of an electrical machine according to a first embodiment.

FIG. 1 shows a detail of a schematic sectional view of a first embodiment of an electrical machine 10 for a vehicle (e.g., for an aircraft). In this case, the vehicle may be driven by the electrical machine 10. The electrical machine 10 has a stator, not shown in FIG. 1, and a rotor, not shown in FIG. 1. The rotor may be driven by the stator and, in this way, may be rotated about a rotation axis relative to the stator. For example, at least one propeller of the aircraft may be driven by the rotor, so that the aircraft may be made to fly using the electrical machine 10. In other words, the aircraft may be driven in the air using the electrical machine 10. To this end, the electrical machine 10 is operated in a motor mode and therefore as an electric motor. In the motor mode, the rotor and, by the rotor, the propeller are driven by the stator and therefore rotated about the rotation axis relative to the stator. Use as a generator (e.g., an electrical machine that is driven by an internal combustion engine or turbine) is expressly likewise possible and also covered.

The electrical machine 10 has at least one first coil 12 (e.g., a first coil) and at least one second coil 14 (e.g., a second coil) that are wound, for example, onto a laminated core 16 of the electrical machine 10. In other words, the first coil 12 and the second coil 14 are wound around respective subregions of the laminated core 16, so that the first coil 12 and the second coil 14 are held on the laminated core 16. To this end, the laminated core 16 has respective teeth 18; the teeth 18 are immediately or directly adjacent to one another in a circumferential direction that runs around the rotation axis. The circumferential direction is a circumferential direction of the electrical machine 10 and therefore of the stator or of the rotor. This provides that no further tooth of the laminated core 16 is arranged between the teeth 18 in the circumferential direction of the electrical machine 10. A slot 20 of the laminated core 16 is arranged between the teeth 18 in the circumferential direction of the electrical machine 10, where the first coil 12 and the second coil 14 are each arranged at least partially in the slot 20. The first coil 12 is wound around a first one of the teeth 18, and the second coil 14 is wound around a second one of the teeth 18. Therefore, the first coil 12 and the second coil 14 are also immediately or directly adjacent to one another (e.g., adjacent coils 12 and 14), so that no other coil or winding of the electrical machine 10 is arranged between the adjacent coils 12 and 14 in the circumferential direction.

Each coil of the first coil 12 and the second coil 14 has at least one electrical conductor 22 that is formed, for example, from copper, and therefore, the at least one conductor 22 is configured, for example, as a copper conductor. The respective conductor 22 is wound around the tooth 18 in this case, so that in this way the respective coil 12 or 14 is formed at least by the respective conductor 22. The respective conductor 22 is, for example, a partial conductor and provided with a partial conductor insulation and in this way electrically insulated.

An electrical insulation (e.g., a main insulation 24 or 26) is associated with the respective coil 12 or 14. This provides that the main insulation 24 is associated with the first coil 12, and the main insulation 26 is associated with the second coil 14, so that the first coil 12 is electrically insulated by the main insulation 24 and the second coil 14 is electrically insulated by the main insulation 26. FIG. 1 illustrates that the respective main insulation 24 or 26 surrounds at least a length region of the respectively associated coil 12 or 14 completely circumferentially in a corresponding circumferential direction, so that at least the respective length region of the respective coil 12 or 14 is sheathed by the respective main insulation 24 or 26 completely circumferentially in the circumferential direction. For example, the respective coil 12 or 14 is at least predominantly (e.g., completely) sheathed by the respectively associated main insulation 24 or 26 and, in this way, electrically insulated (e.g., toward the respectively other coil 14 or 12). The respective main insulation 24 or 26 is therefore also referred to as the first sheathing.

In order to now be able to provide particularly safe operation of the electrical machine 10 and therefore of the aircraft overall, a first electrically conductive layer 28, which is provided in addition to the first coil 12 and the second coil 14 and in addition to the main insulations 24 and 26, is associated with the first coil 12 and therefore the main insulation 24. The first electrically conductive layer 28 is arranged between the first coil 12 and the second coil 14 (e.g., in the circumferential direction of the electrical machine 10). A second electrically conductive layer 30, which is provided in addition to the first coil 12 and the second coil 14, in addition to the main insulations 24 and 26 and in addition to the first electrically conductive layer 28, is associated with the second coil 14 and therefore the main insulation 26. The second electrically conductive layer 30 is likewise arranged between the first coil 12 and the second coil 14. FIG. 1 illustrates that the respective electrically conductive layer 28 or 30 is configured as a second sheathing of the respective associated coil 12 or 14 in the first embodiment shown in FIG. 1. Therefore, the respective second sheathing surrounds at least a length region of the respective coil 12 or 14 completely circumferentially in a corresponding circumferential direction. For example, the respective coil 12 or 14 may be at least partially (e.g., at least predominantly or completely) sheathed by the respective second sheathing completely circumferentially in the circumferential direction. In the first embodiment, the respective second sheathing is arranged outside the respective main insulation 24 or 26, so that the main insulation 24 is arranged between the first coil 12 and the second sheathing (e.g., the first electrically conductive layer 28). Accordingly, the second sheathing (e.g., the second electrically conductive layer 30) is also arranged outside the main insulation 26, so that the main insulation 26 is arranged between the second coil 14 and the second electrically conductive layer 30 (e.g., second sheathing). The first electrically conductive layer 28 is arranged between the second electrically conductive layer 30 and the first coil 12, whereas the second electrically conductive layer 30 is arranged between the first electrically conductive layer 28 and the second coil 14. The respective electrically conductive layer 28 or 30 may be formed by a solid component (e.g., by a component in the solid state of aggregation). The respective electrically conductive layer 28 or 30 may be formed in one piece, or else the respective electrically conductive layer 28 or 30 has a plurality of parts that are formed separately from one another and are connected to one another. In one embodiment, the respective electrically conductive layer (e.g., the respective electrically conductive layer 28 or 30 or the respective component that forms the respective electrically conductive layer 28 or 30) may be configured in a flexible or dimensionally unstable manner or in a rigid or dimensionally stable manner.

The first electrically conductive layer 28 and the second electrically conductive layer 30 may be electrically connected to one another with a high impedance. In other words, a high-impedance electrical connection 32 is provided, via which the first electrically conductive layer 28 and the second electrically conductive layer 30 are electrically connected to one another. The high-impedance connection 32 has at least or precisely one electrical resistor R for each electrically conductive layer 28 or 30, for example. In addition, the first electrically conductive layer 28 and the second electrically conductive layer 30 are electrically connected to a predetermined ground potential 34, so that the first electrically conductive layer 28 and the second electrically conductive layer 30 are, for example, connected to ground. In other words, a high-impedance ground connection of the first electrically conductive layer 28 and the second electrically conductive layer 30 is, for example, provided (e.g., such that the first electrically conductive layer 28 and the second electrically conductive layer 30 are electrically connected to the predetermined ground potential 34 with a high impedance and via the resistors R).

In this case, the predetermined ground potential 34 is used as the reference potential in order to detect at least one electrical voltage between the first electrically conductive layer 28 and the second electrically conductive layer 30 and the reference potential (e.g., predetermined ground potential 34) by a detection device 36 (e.g., a measuring device). In other words, the electrical machine 10 includes the detection device 36, by which a voltage measurement may be carried out. As part of the voltage measurement operation, the abovementioned electrical voltage between the first electrically conductive layer 28 and the second electrically conductive layer 30 and the predetermined ground potential 34 is detected (e.g., measured) by the detection device 36. If, for example, the detection device 36 detects that the electrical voltage that is detected by the detection device 36 exceeds a prespecifiable threshold value, a short circuit between one of the first coil 12 and the second coil 14 and at least one of the first electrically conductive layer 28 and the second electrically conductive layer 30 may be inferred in this way, so that damage to at least one of the main insulations 24 and 26 may be inferred as a result. Consequently, at least one protective measure or countermeasure may be carried out; as part of this, for example, the electrical machine 10 is switched off. Consequently, for example, total failure of a drive train, which includes the electrical machine 10, for electrically driving the vehicle may be prevented.

The connection 32 further has a busbar 38 to which the electrically conductive layers 28 and 30 are electrically connected (e.g., via the resistors R). Therefore, the electrically conductive layers 28 and 30 and possibly all further electrical layers (not illustrated) of same construction are electrically connected to one another via the busbar 38. In addition, the electrically conductive layers 28 and 30 are electrically connected to the predetermined ground potential 34, which is common to the electrically conductive layers 28 and 30, via the busbar 38.

Figure 2:
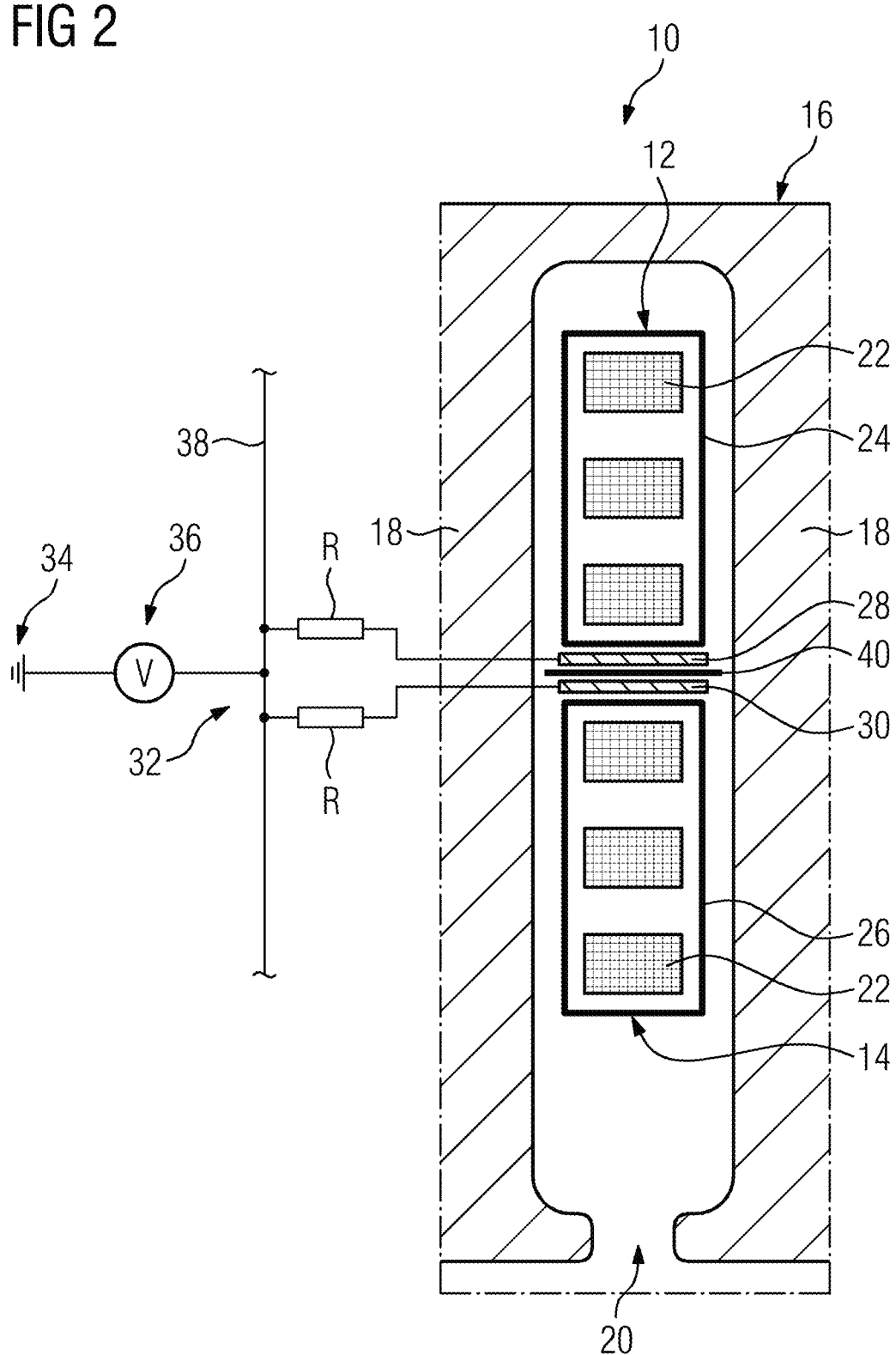
FIG. 2 shows a detail of a schematic sectional view of the electrical machine according to a second embodiment.

FIG. 2 shows a second embodiment of the electrical machine 10. Whereas in the first embodiment the respective electrically conductive layer 28 or 30 is configured as a sheathing of the respective coil 12 or 14, so that in the first embodiment the respective electrically conductive layer 28 or 30 is arranged on at least two sides of the respective coil 12 or 14 that differ from one another and, for example, are averted from one another, the respective electrically conductive layer 28 or 30 is configured as a substantially two-dimensional layer in the second embodiment. This provides that the respective electrically conductive layer 28 or 30 is arranged only on precisely one side of the respective coil 12 or 14, so that in the second embodiment in each case only precisely one side of the respective coil 12 or 14 is covered or overlapped by the respective electrically conductive layer 28 or 30 toward the respectively other coil 14 or 12.

In this case, at least one phase separator 40 is arranged between the electrically conductive layers 28 and 30 that are electrically insulated from one another by the phase separator 40.

A further difference between the first embodiment and the second embodiment is that the first coil 12 and the second coil 14, which are arranged in the slot 20, follow one another in the circumferential direction (e.g., directly) in the first embodiment, so that no other coil is arranged between the first coil 12 and the second coil 14. In the second embodiment, however, the first coil 12 and the second coil 14 are arranged so as to follow one another or one behind the other in the radial direction of the electrical machine 10, where, for example, the second coil 14 is at least partially (e.g., at least predominantly or completely) covered or overlapped by the first coil 12 in the radial direction of the electrical machine 10 toward the outside.

Machines that are arranged in a linear manner (e.g., linear motors) are not illustrated but are likewise covered by the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An electrical machine comprising:
a core having a first tooth and a second tooth;
at least one first coil that is sheathed at least in a subregion by a first electrical insulation, the at least one first coil being wrapped around the first tooth;
at least one second coil that is sheathed at least in a subregion by a second electrical insulation, the at least one second coil being wrapped around the first tooth or the second tooth;
at least one electrically conductive layer that is provided in addition to the at least one first coil and the at least one second coil, and in addition to the first electrical insulation and the second electrical insulation, the at least one electrically conductive layer being arranged between the at least one first coil and the at least one second coil; and
a detection device operable to detect an electrical voltage between the at least one electrically conductive layer and a reference potential,
wherein the detection device is configured to identify a short circuit between a coil of the at least one first coil and the at least one second coil and an electrically conductive layer of the at least one electrically conductive layer, the identification of the short circuit comprising:
comparison of the detected electrical voltage to a predetermined threshold value; and
based on the comparison, identification of the short circuit when the detected electrical voltage is greater than the predetermined threshold value.

2. The electrical machine of claim 1, wherein the at least one electrically conductive layer is arranged within the first insulation between the first insulation and the at least one first coil.

3. The electrical machine of claim 2, wherein the at least one electrically conductive layer surrounds at least a portion of the at least one first coil on at least two sides that are averted from one another.

4. The electrical machine of claim 1, wherein the at least one electrically conductive layer is arranged outside the first insulation such that the first insulation is arranged between the at least one electrically conductive layer and the at least one first coil.

5. The electrical machine of claim 1, wherein the at least one electrically conductive layer is at least one first electrically conductive layer, and
wherein the electrical machine further comprises at least one second electrically conductive layer that is provided in addition to the at least one first coil and the at least one second coil, and in addition to the first electrical insulation and the second insulation, the at least one second electrically conductive layer being arranged between the at least one first coil and the at least one second coil.

6. The electrical machine of claim 5, further comprising a phase separator,
wherein the at least one first electrically conductive layer and the at least one second electrically conductive layer are electrically insulated from one another by the phase separator, which is arranged between the at least one first electrically conductive layer and the at least one second electrically conductive layer.

7. The electrical machine of claim 6, wherein the at least one second electrically conductive layer surrounds at least a portion of the at least one second coil on at least two sides that are averted from one another.

8. The electrical machine of claim 5, wherein the at least one second electrically conductive layer is arranged within the second insulation between the second insulation and the at least one second coil.

9. The electrical machine of claim 5, wherein the at least one second electrically conductive layer is arranged outside the second insulation, such that the second insulation is arranged between the at least one second electrically conductive layer and the at least one second coil.

10. The electrical machine of claim 5, wherein the at least one first electrically conductive layer and the at least one second electrically conductive layer are electrically connected to one another with an impedance.

11. The electrical machine of claim 1, wherein the at least one electrically conductive layer is electrically connected to a predetermined ground potential with an impedance.

12. The electrical machine of claim 1, wherein the reference potential is a ground potential.

13. An aircraft comprising:
at least one electrical machine, an electrical machine of the at least one electrical machine comprising:
a core having a first tooth and a second tooth;
a first coil that is sheathed at least in a subregion by a first electrical insulation, the first coil being wrapped around the first tooth;
a second coil that is sheathed at least in a subregion by a second electrical insulation, the second coil being wrapped around the first tooth or the second tooth;
an electrically conductive layer that is provided in addition to the first coil and the second coil, and in addition to the first electrical insulation and the second electrical insulation, the electrically conductive layer being arranged between the first coil and the second coil; and
a detection device operable to detect an electrical voltage between the electrically conductive layer and a reference potential,
wherein the detection device is configured to identify a short circuit between a coil of the first coil and the second coil and the electrically conductive layer, the identification of the short circuit comprising:
comparison of the detected electrical voltage to a predetermined threshold value; and
based on the comparison, identification of the short circuit when the detected electrical voltage is greater than the predetermined threshold value.

14. The aircraft of claim 13, wherein the electrically conductive layer is arranged within the first insulation between the first insulation and the first coil.

15. The aircraft of claim 14, wherein the electrically conductive layer surrounds at least a portion of the first coil on at least two sides that are averted from one another.

16. The aircraft of claim 13, wherein the electrically conductive layer is arranged outside the first insulation, such that the first insulation is arranged between the electrically conductive layer and the first coil.

17. The aircraft of claim 13, wherein the electrically conductive layer is a first electrically conductive layer, and
wherein the electrical machine further comprises a second electrically conductive layer that is provided in addition to the first coil and the second coil, and in addition to the first electrical insulation and the second insulation, the second electrically conductive layer being arranged between the first coil and the second coil.

18. The aircraft of claim 17, wherein the electrical machine further comprises a phase separator, and
wherein the first electrically conductive layer and the second electrically conductive layer are electrically insulated from one another by the phase separator, which is arranged between the first electrically conductive layer and the second electrically conductive layer.

* * * * *